(12) United States Patent
Friman et al.

(10) Patent No.: US 8,447,240 B2
(45) Date of Patent: May 21, 2013

(54) TUNABLE ANTENNAS FOR MOBILE HANDSETS

(75) Inventors: Alf Friman, Vaxjo (SE); Sverker Petersson, Nybro (SE)

(73) Assignee: Flextronics AP, LLC, Broomfield, CO (US)

( * ) Notice: Subject to any disclaimer, the term of this patent is extended or adjusted under 35 U.S.C. 154(b) by 831 days.

(21) Appl. No.: 12/233,022

(22) Filed: Sep. 18, 2008
(Under 37 CFR 1.47)

(65) Prior Publication Data
US 2010/0112936 A1    May 6, 2010

Related U.S. Application Data

(60) Provisional application No. 60/973,833, filed on Sep. 20, 2007.

(51) Int. Cl.
*H04B 1/40* (2006.01)

(52) U.S. Cl.
USPC ............. 455/77; 455/3.06; 343/745; 343/748

(58) Field of Classification Search
USPC ................... 455/77, 269, 3.06; 343/745, 748
See application file for complete search history.

(56) References Cited

U.S. PATENT DOCUMENTS

| | | | | |
|---|---|---|---|---|
| 5,686,903 | A * | 11/1997 | Duckworth et al. | 340/5.25 |
| 2004/0009754 | A1* | 1/2004 | Smith, Jr. | 455/82 |
| 2005/0052334 | A1* | 3/2005 | Ogino et al. | 343/866 |
| 2006/0183443 | A1* | 8/2006 | Chang et al. | 455/121 |

* cited by examiner

*Primary Examiner* — Nguyen Vo
*Assistant Examiner* — Hsin-Chun Liao
(74) *Attorney, Agent, or Firm* — Marsh Fischmann & Breyfogle, LLP; Daniel J. Sherwinter

(57) ABSTRACT

A system and method for providing a tunable antenna system within a mobile device that enables the mobile device to receive broadcast communication signals. The antenna system includes a tunable antenna and a tuning module that is operable to selectively adjust the resonant frequency of the tunable antenna, such that the antenna may efficiently receive a plurality of discrete narrow band signals across a broad frequency spectrum. The tuning module may also include a lookup table for use by the tuning module to selectively adjust the resonant frequency of the antenna. Further, the antenna system may include a temperature compensation module that is operable to compensate for any temperature sensitive components in the tunable antenna system.

18 Claims, 3 Drawing Sheets

TUNABLE ANTENNAS FOR MOBILE HANDSETS

CROSS-REFERENCE TO RELATED APPLICATION

This application claims priority under 35 U.S.C. 119 to U.S. Provisional Application No. 60/973,833, entitled: "TUNABLE ANTENNAS FOR MOBILE HANDSETS," filed on Sep. 20, 2007, the contents of which are incorporated herein as if set forth in full.

BACKGROUND

Antennas are used in a variety of radio frequency communications and, as such, exist in a variety of shapes and sizes. Additionally, antennas may be configured from a variety of materials, such as copper, aluminum, and even certain dielectric materials. For example, antenna design generally requires that an antenna's shape and/or size directly relate to the frequency for which it is to be used. In other words, a particular communication system may operate at a predetermined frequency, the value of which is used in the computation of the antenna's shape and size.

Higher frequencies generally require smaller antennas for adequate gain, whereas lower frequencies generally require larger antennas for adequate gain. In this regard, antennas that are specifically designed for a particular frequency provide an initial means for filtering a signal by attenuating signals outside the desired range of communications. However, the rigid nature of antenna design can make communication schemes less flexible.

Modern cellular telephony is one area where flexible communication schemes may be desirable. For example, many different standards and frequency ranges now exist in cellular telephony, such as Code Division Multiple Access (CDMA) cellular telephony which may operate at the 1.9 GHz range, and Global System for Mobile (GSM) cellular telephony which may operate at the 900 MHz and 1.8 GHz frequency ranges. Since space is limited in cellular phones, having a single antenna configured with a cellular telephone that would communicate with such a variety of communication standards would allow a cell phone user to communicate with a variety of phone service providers. For example, a cell phone user in the United States possessing a cell phone with flexible communications capabilities and communicating via the Personal Communications Services (PCS) standard may be able to switch and communicate via the GSM standard using the same cell phone while traveling to Europe.

Antennas that are suitable for flexible communication schemes (e.g., a wide range of frequencies) may enable mobile devices to operate with other forms of communication systems. For example, present cellular telephones are also being configured with a relatively large amount of processing power, which enables them to function as more than merely telephones. This processing power could be used to deliver other forms of communication, such as from broadcast television and radio stations. Television broadcasts are commonly transmitted at ultrahigh frequencies (UHF), such as between 474 MHz and 798 MHz. A variety of antennas exist which can be used to receive signals on such frequencies; however, such antennas are generally large, inefficient, and not configurable with mobile devices.

It is against this background that the tunable antennas for mobile handsets disclosed herein have been invented.

SUMMARY

The following embodiments and aspects of thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

According to a first aspect, a tunable antenna that is configured within a mobile device for receiving radio communication signals across a relatively large frequency spectrum is provided. The tunable antenna includes an antenna element configured to receive a radio frequency signal. Further, the tunable antenna includes a tuning component coupled to the antenna element, wherein the tuning component is configured for altering a frequency characteristic of the tunable antenna.

According to a second aspect, an antenna tuning system that is configured within a mobile device, wherein the mobile device is configured for receiving communication signals across a relatively large frequency spectrum is provided. The antenna tuning system includes a tunable antenna, and a tuning module configured for adjusting the resonant frequency characteristics of the tunable antenna.

According to a third aspect, a method for providing a mobile device that is configured for receiving communication signals across a relatively large frequency spectrum is provide. The method includes providing a mobile device that includes a tunable antenna, and selectively adjusting the resonant frequency characteristics of the tunable antenna.

In addition to the exemplary aspects and embodiments described above, further aspects and embodiments will become apparent by reference to the drawings and by study of the following descriptions.

DETAILED DESCRIPTION

Figure 1:
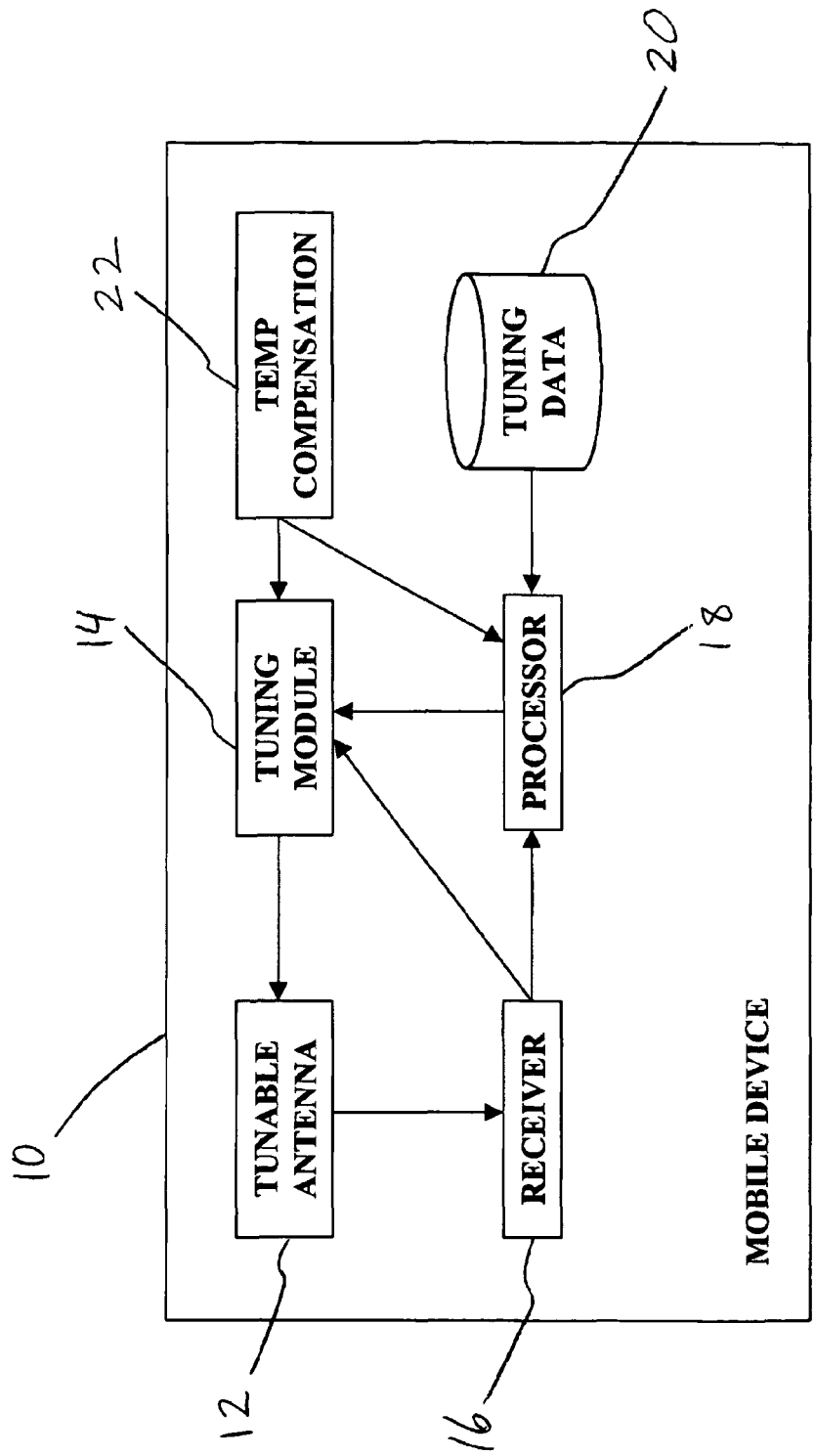
FIG. 1 is a block diagram of a mobile device that includes a tunable antenna system.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

FIG. 1 illustrates a block diagram of a mobile device 10 (e.g., a cell phone, PDA, computer, or the like) that includes a tunable antenna system. The mobile device 10 includes a tunable antenna 12 that may be configured with one or more components (e.g., a varactor diode, a mechanically tuned capacitor, a thin film ferro electrical capacitor, or the like) that permits the antenna 12 to have a plurality of unique resonant frequencies. The tunable antenna 12 may enable the mobile device 10 to operate with a plurality of communication schemes. As an example, the tunable antenna 12 may be used to receive UHF television signals operating at frequencies varying between about 459 MHz and 850 MHz (e.g., television channels having center frequencies between about 474 MHz and 798 MHz). The tunable antenna 12 may receive a broadcast television signal at one frequency and, based on a user's input, subsequently tune to another frequency to receive a different broadcast television signal. However, the tunable antenna system is not intended to be limited to merely the reception of UHF television signals. Rather, the tunable antenna system may be configured to receive other signals such as AM or FM radio communications (e.g., operating between 87 MHz and 110 MHz), VHF television signals, cellular communications, and/or operate with other frequency/communication schemes, or any combination thereof. Advantageously, the tunable antenna 12 permits a relatively small antenna to have a resonance frequency over a relatively wide band. In other words, a standard antenna that was capable of suitably receiving signals that span such a wide band of frequencies would normally be large in size and weight, which is undesirable for mobile handset applications.

The mobile device 10 may also include a tuning module 14 that is generally operable to control the tuning of the tunable antenna 12. For example, in response to a user's input selecting a broadcast channel, the tuning module 14 may send a signal (e.g., a voltage signal) to the tunable antenna 12, which has the effect of adjusting the resonant frequency of the antenna 12 to a desired value (e.g., a frequency that corresponds to a particular television station's broadcast frequency).

In this regard, the mobile device 10 may be configured with algorithms that provide for the calibration/tuning of the tunable antenna 12. For example, a processor 18 may be configured with a mobile device to process a feedback signal from a receiver 16 (e.g., also configured with the mobile device 10) and adjust the antenna tuning in real time. In other words, when a received signal quality is poor (e.g., error rate is high), the mobile device 10 may automatically correct the detuning based on the feedback signal. In this regard, a received signal may be digitized and processed by the processor 18 to extract the underlying information (e.g., display a television broadcast). For example, if the bit error rate of the processed signal is high, the processor 18 may generate a control signal for use by the tuning module 14 to change the frequency characteristics of the antenna 12. That is, a control loop may operate to tune the antenna 12 until the bit error rate improves. Further, if the bit error rate does not improve upon tuning, the processor 18 may determine that the received signal is merely too weak to process.

Additionally, tables (e.g., lookup tables) may be loaded into a tuning data storage device 20 configured with the mobile device 10. These tables may be used to automatically tune the antenna 12. For example, in an embodiment shown in FIG. 2, a varactor diode is included in a resonant loop antenna circuit to provide a variable resonant frequency for the tunable antenna 12. Since the capacitance of a varactor diode is dependent upon the reverse voltage applied thereto, the resonant frequency of the antenna 12 may be modified by selectively adjusting the applied voltage. The capacitance response of different varactor diodes may vary and, generally, these responses are nonlinear. However, the varactor diode capacitance response for an individual varactor diode may be determined empirically, for example, during manufacturing. Accordingly, the frequency response for the tunable antenna 12 may be stored in a table (or mathematical formula) that associates control voltage increments with desired resonant frequencies. The table may be stored within the mobile device 10 such that the tuning module 14 may generate a certain control voltage when a certain frequency is desired by receiving instructions from the processor 18.

Other tables or formulas may also be generated and used for tuning the antenna 12. For example, varactor diodes are often temperature dependent in that their capacitance changes as their temperature changes. As an illustration, even the body temperature of a mobile handset user could change the temperature of the varactor diode enough to affect its capacitance, thereby causing detuning of the antenna 12. In this regard, another table may be generated based on empirically determined capacitance characteristics of the varactor diode that are associated with temperature changes. This table may then be used to vary the control voltage applied to the varactor diode based on a given temperature and thereby adjust the frequency characteristics of the varactor diode and the loop antenna.

Figure 3:
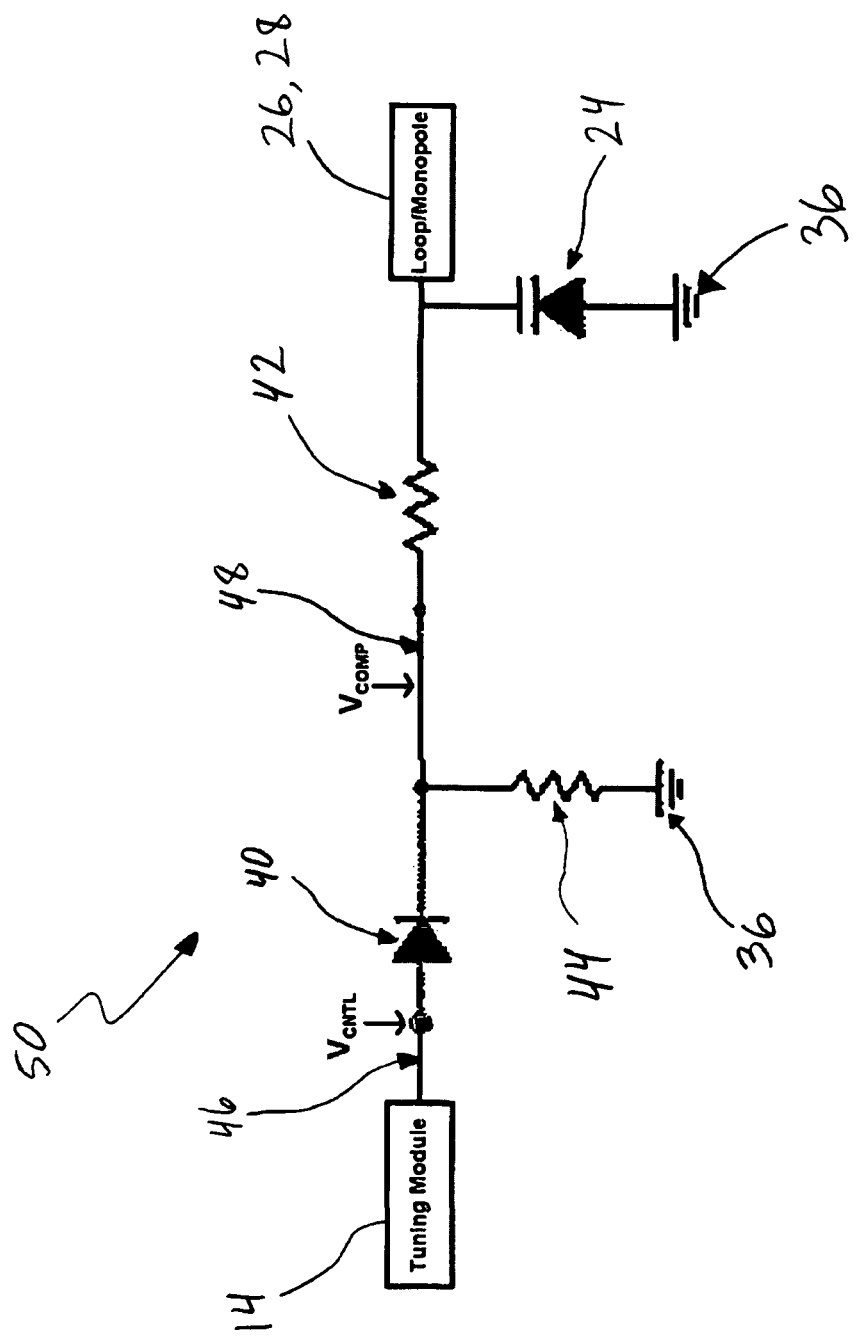
FIG. 3 is a schematic diagram of an exemplary embodiment of a temperature compensation circuit for a tunable antenna.

To provide for the aforementioned temperature compensation, a temperature compensation module 22 may be included in the mobile device 10. The module 22 may include a temperature sensing mechanism that functions to provide information regarding the temperature of the mobile device 10 to the processor 18 or the tuning module 14, so that the control signal applied to the tunable antenna 12 may be modified accordingly. One example of a low cost and reliable temperature compensation module is illustrated in FIG. 3.

Varactor diodes and other variable capacitance components also have certain variances associated with their manufacture. For example, a certain varactor diode design may result in a varactor diode implementation that actually varies from the intended characteristics. These variances could also be determined empirically and accounted for using tables that can be used to tune the resonant frequencies of the antenna 12.

Figure 2:
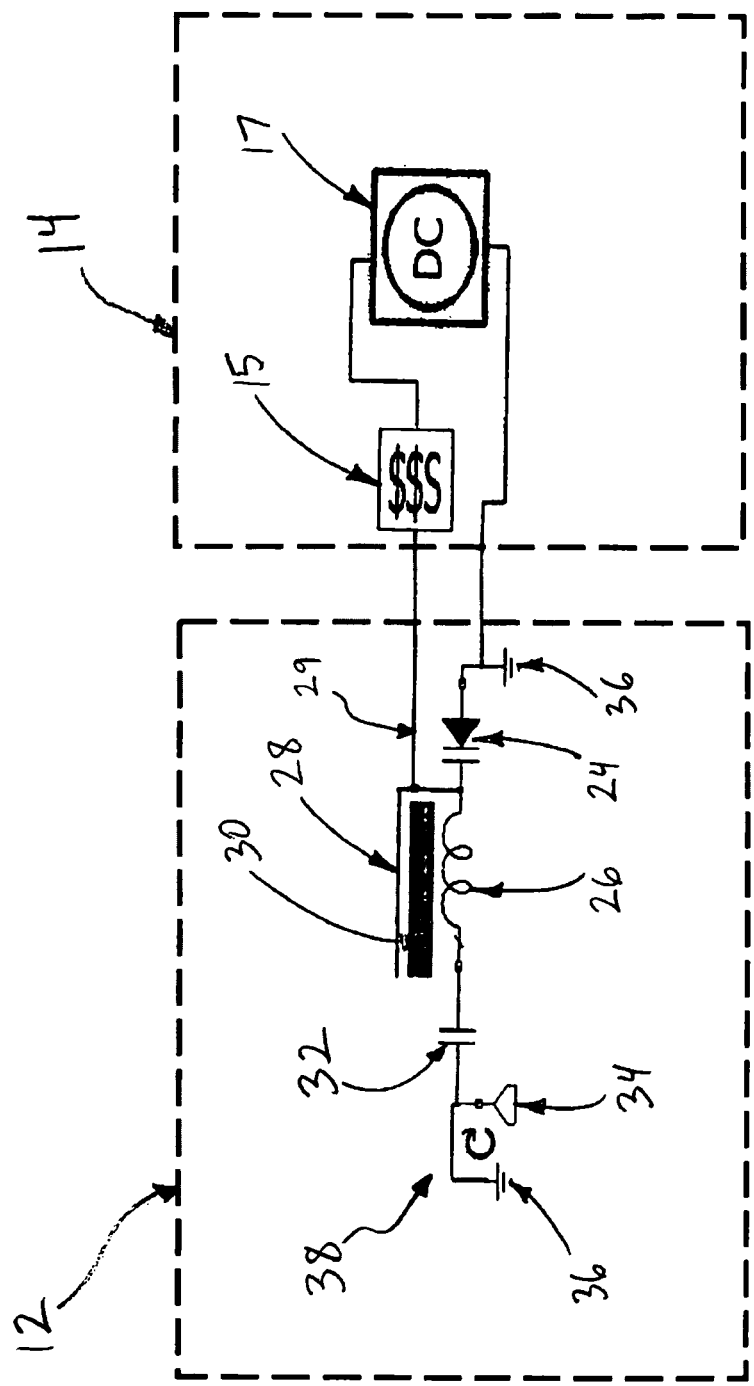
FIG. 2 is a schematic diagram of an exemplary embodiment of a tunable antenna system.

One embodiment of a tunable antenna 12 and tuning module 14 is illustrated in FIG. 2. The tunable antenna 12 is configured as a loop antenna with a dielectric monopole element 28 (e.g., a monopole antenna having a dielectric material 30 disposed therewith) and a loop, shown as an inductor 26. The dielectric 30 may include air, a ceramic material, or any other suitable dielectric substance, and may function to reduce the lowest achievable resonant frequency of the antenna 12 without increasing its size. Further, the monopole 28 and inductor 26 may be configured in any suitable pattern including two dimensional (2D) and three dimensional (3D) patterns.

In this embodiment, an RF port 34 that may be connected to a receiver is coupled to the inductor 26 through a DC blocking capacitor 32. To provide a variably frequency resonance circuit, a varactor diode 24 is disposed in series with the inductor 26. As can be appreciated, the resonant frequency of the antenna 12 is determined by the inductance and capacitance values for the inductor 26 and the varactor diode 24, respectively.

To control the capacitance of the varactor diode 24, and in turn the resonant frequency of the antenna 12, the tuning module 14 is coupled to the cathode and anode (i.e., ground node 36) of the varactor diode 24. The tuning module 14 includes a voltage source 17 that is operable to selectively apply a DC voltage to the cathode of the varactor diode 24. Further, to reduce the possibility that the DC control voltage will affect the functionality of the antenna 12, a low pass filter 15 may be provided between the voltage source 17 and the varactor diode 24. Further, the antenna 12 may include a gamma match 38 for improving antenna matching and for shorting DC signals to ground. It should be appreciate that the specific configuration of the aforementioned components may not be unique, and that other configurations may be used to achieve the same desirable functionality for the tunable antenna system.

As noted above, the frequency characteristics of the tunable antenna 12 are changed based on the application of a control signal applied to the cathode of the varactor diode 24. For example, the capacitance of a varactor diode may be inversely proportional to the square root of the applied voltage. Accordingly, as the applied voltage is increased, a varactor diode's capacitance decreases. As is generally known to those skilled in the art, a decreasing capacitance in a resonant circuit corresponds to an increase in resonant frequency. Thus, by increasing the voltage of the control signal applied to the varactor diode 24, the tunable antenna 12 may be tuned to higher resonant frequencies. Similarly, decreasing the voltage of the control signal results in tuning the antenna 12 to lower frequencies.

FIG. 3 is a schematic diagram of an exemplary embodiment of a temperature compensation circuit 50 for a tunable antenna, such as the tunable antenna 12 shown in FIG. 2. As shown, the temperature compensation circuit 50 may be positioned in a serial arrangement at a node 29 of the antenna system shown in FIG. 2. In this regard, the temperature compensation circuit 50 resides between the tuning module 14 and the varactor diode 24. The circuit 50 includes a silicon diode 40 that is coupled in series between the DC control signal ($V_{CNTL}$) and the varactor diode 24. Further, a voltage divider that includes resistors 42 and 44 may be provided to supply a desired voltage to the cathode of the varactor diode 24. In operation, the silicon diode 40 is selected to have a matching but opposite temperature coefficient to the varactor diode 24. In this regard, the variations in the voltage drop across the diode 40 due to temperature cause variations in the voltage applied to the varactor diode 24 that have the effect of compensating for changes in capacitance due to temperature. Therefore, the capacitance of the varactor diode 24 as a function of $V_{CNTL}$ remains relatively stable across a wide range of temperatures. Those skilled in the art will readily recognize other methods that may be used to provide temperature compensation to the tunable antenna system.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed:

1. A tunable antenna that is configured within a mobile device for receiving radio communication signals across multiple frequency bands, the tunable antenna comprising:
   an antenna element sized to fit within a handheld mobile device and comprising a loop antenna element and a monopole antenna element, the monopole antenna element having a dielectric material disposed therewith configured to reduce a lowest achievable resonant frequency of the antenna element without increasing its size;
   a tuning component coupled at the antenna element, wherein the tuning component is configured for altering a frequency characteristic of the antenna element and configured so that an electrical property of the tuning component changes by a magnitude as a function of a change in temperature, and configured to tune the antenna element to receive radio frequency signals across both a cellular telephony band and at least one other non-overlapping, relatively low-frequency band; and
   a temperature compensation component configured so that an electrical property of the temperature compensation component changes by the magnitude in an opposite direction as a function of the change in temperature, the temperature compensation component coupled with the tuning component so that the change in the electrical property of the temperature compensation component compensates for the change in the electrical property of the tuning component.

2. The tunable antenna of claim 1, wherein the non-overlapping, relatively low-frequency band includes the UHF spectrum.

3. The tunable antenna of claim 1, wherein the tuning component includes a varactor diode.

4. The tunable antenna of claim 1, wherein the dielectric material includes a ceramic material.

5. The tunable antenna of claim 1, wherein the tunable antenna is configured for transceiving cellular telephony signals and receiving at least one of broadcast television signals and broadcast radio signals.

6. A tunable antenna system that is configured with a mobile device, wherein the mobile device is configured for receiving communication signals across multiple frequency bands, the system comprising:
   a tunable antenna sized to fit within a handheld mobile device and comprising a loop antenna element and a monopole antenna element, the monopole antenna element having a dielectric material disposed therewith configured to reduce a lowest achievable resonant frequency of the tunable antenna without increasing its size;
   a tuning module configured for automatically adjusting the resonant frequency characteristics of the tunable antenna, the resonant frequency characteristics of the tunable antenna changing by a magnitude as a function of a change in temperature, the tuning module further configured to tune the antenna element to receive radio frequency signals across both a cellular telephony band and at least one other non-overlapping, relatively low-frequency band; and
   a temperature compensation module in communication with the tunable antenna and configured to change an electrical property as a function of the change in temperature thereby compensating for the changing resonant frequency characteristics of the tunable antenna.

7. The system of claim 6, further comprising a receiver that is operable to demodulate the received communication signals and convert the received communication signals to digital signals.

8. The system of claim 7, further comprising a processor that is operable to process the digital signals to determine a level of detuning by the tunable antenna, and where the tuning module automatically adjusts the resonant frequency characteristics of the tunable antenna dependent upon the level of detuning.

9. The system of claim 8, wherein the processed digital signals include bit error rate information, and wherein the tuning module generates a DC control signal for adjusting the resonant frequency characteristics of the tunable antenna dependent upon the bit error rate information.

10. The system of claim 9, wherein the tuning module includes a varactor diode, and wherein the DC control signal is applied to the varactor diode to change the capacitance thereof, and wherein the change in capacitance functions to change the resonant frequency characteristics of the tunable antenna.

11. The system of claim 10, further including a low pass filter configured for filtering the DC control signal prior to application to the varactor diode.

12. The system of claim 6, further including a lookup table that is usable by the tuning module to generate a control signal for changing the resonant frequency characteristics of the tunable antenna.

13. The system of claim 12, wherein the lookup table is configured from empirical capacitance versus voltage data for a varactor diode, and wherein the lookup table includes data relating to variations of capacitance due to changes in temperature.

14. A method for providing a mobile device that is configured for receiving communication signals across multiple frequency bands, the method comprising: selectively adjusting the resonant frequency characteristics of a tunable antenna of the mobile device by adjusting an electrical property of the tunable antenna, the electrical property of the tunable antenna changing by a magnitude as a function of a change in temperature, wherein the tunable antenna is sized to fit within a handheld mobile device and comprises a loop antenna element and a monopole antenna element, the monopole antenna element having a dielectric material disposed therewith configured to reduce a lowest achievable resonant frequency of the tunable antenna without increasing its size, the tunable antenna being configured to be tuned to receive radio frequency signals across both a cellular telephony band and at least one other non-overlapping, relatively low-frequency band; and compensating for the changing electrical property of the tunable antenna by automatically changing an electrical property of a compensation module coupled with the tunable antenna, the electrical property of a compensation module changing as a function of the change in temperature thereby offsetting the changing electrical property of the tunable antenna.

15. The method of claim 14, further comprising:
receiving a communication signal from the tunable antenna; and
processing the received communication signal into a format the provides information relating to the resonant frequency characteristics of the tunable antenna;
wherein the selectively adjusting is dependent upon the processed communication signal.

16. The tunable antenna of claim 1, wherein the change in the electrical property of the temperature compensation component partially compensates for the change in the electrical property of the tuning component.

17. The tunable antenna of claim 1, wherein:
the electrical property of the tuning component is a first temperature coefficient;
the electrical property of the temperature compensation component is a second temperature coefficient; and
the first temperature coefficient is substantially the complement of the first temperature coefficient.

18. The tunable antenna of claim 1, wherein:
the tuning component includes a varactor diode, and the electrical property of the tuning component is a first capacitance of the varactor diode that varies as a function of temperature; and
the electrical property of the temperature compensation component is a second capacitance that varies as a function of temperature in opposition to the varying of the first capacitance as a function of temperature.

* * * * *